(12) United States Patent
Bao et al.

(10) Patent No.: US 10,848,096 B2
(45) Date of Patent: Nov. 24, 2020

(54) ROTATING MECHANISM

(71) Applicant: SHANGHAI SIPOOO NEW TECHNOLOGY CO., LTD., Shanghai (CN)

(72) Inventors: Weiming Bao, Shanghai (CN); Xinming Guo, Shanghai (CN); Keya Yang, Shanghai (CN)

(73) Assignee: SHANGHAI SIPOOO NEW TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/316,624

(22) PCT Filed: Jul. 17, 2017

(86) PCT No.: PCT/CN2017/093206
§ 371 (c)(1),
(2) Date: Jan. 10, 2019

(87) PCT Pub. No.: WO2018/014813
PCT Pub. Date: Jan. 25, 2018

(65) Prior Publication Data
US 2019/0222168 A1    Jul. 18, 2019

(30) Foreign Application Priority Data
Jul. 19, 2016   (CN) .......................... 2016 1 0569582

(51) Int. Cl.
*H02S 20/32*         (2014.01)
*F16M 11/20*         (2006.01)

(52) U.S. Cl.
CPC ......... *H02S 20/32* (2014.12); *F16M 11/2014* (2013.01)

(58) Field of Classification Search
CPC .................................. H02S 20/32; G05D 3/12
See application file for complete search history.

(56) References Cited

U.S. PATENT DOCUMENTS

| 4,649,899 | A | * | 3/1987 | Moore ................. | G01S 3/7861 |
| | | | | | 126/578 |
| 4,771,764 | A | * | 9/1988 | Cluff .................. | H01L 31/0543 |
| | | | | | 126/577 |

(Continued)

FOREIGN PATENT DOCUMENTS

| CN | 105141236 | 12/2015 |
| CN | 205811941 | 12/2016 |

(Continued)

OTHER PUBLICATIONS

"International Search Report (Form PCT/ISA/210)", dated Oct. 31, 2017, with English translation thereof, pp. 1-4.

*Primary Examiner* — Eret C McNichols
(74) *Attorney, Agent, or Firm* — JCIPRNET (57) ABSTRACT

A rotating mechanism includes a base, a disk-shaped support, a traction rope, an input shaft, an output shaft, and a swing arm. The disk-shaped support is fixed to the base, in which a periphery of the disk-shaped support (2) has a winding end. The traction rope is wound around the winding end of the disk-shaped support. The input shaft is configured to tension the traction rope and drive the traction rope to slide along the winding end of the disk-shaped support. The output shaft is configured to connect to an external structure. The swing arm has a first end connected to the traction rope and a second end connected to the output shaft, in which the traction rope drives the swing arm to rotate, and the swing arm further drives the output shaft to rotate.

13 Claims, 3 Drawing Sheets

(56) References Cited

U.S. PATENT DOCUMENTS

| | | | | |
|---|---|---|---|---|
| 2002/0139413 A1* | 10/2002 | Sasaki | H02S 20/32 | |
| | | | 136/246 | |
| 2002/0179138 A1* | 12/2002 | Lawheed | H01L 31/0547 | |
| | | | 136/246 | |
| 2009/0188487 A1* | 7/2009 | Jones | H02S 40/22 | |
| | | | 126/600 | |
| 2014/0338659 A1* | 11/2014 | Corio | H02S 20/32 | |
| | | | 126/714 | |
| 2015/0244304 A1* | 8/2015 | Ozeki | H02S 20/32 | |
| | | | 136/246 | |
| 2017/0179874 A1* | 6/2017 | Knox | F24S 30/20 | |
| 2017/0356422 A1* | 12/2017 | Armstrong | F02G 1/044 | |
| 2018/0128515 A1* | 5/2018 | Habdank | F24S 50/20 | |
| 2018/0234047 A1* | 8/2018 | Wang | F24S 30/452 | |
| 2018/0254739 A1* | 9/2018 | Luo | H02S 30/00 | |
| 2019/0190440 A1* | 6/2019 | Kingsley | F24S 25/636 | |
| 2019/0190445 A1* | 6/2019 | Alderman | H02S 50/15 | |
| 2019/0280642 A1* | 9/2019 | Flann | F24S 30/452 | |
| 2020/0076356 A1* | 3/2020 | Cherukupalli | H02S 20/10 | |

FOREIGN PATENT DOCUMENTS

| | | | | |
|---|---|---|---|---|
| CN | 206224249 | 6/2017 | | |
| DE | 102006036150 | 2/2008 | | |
| JP | 4514827 B1 * | 7/2010 | | F24S 30/422 |

\* cited by examiner

ROTATING MECHANISM

CROSS-REFERENCE TO RELATED APPLICATION

This is a 371 application of the International PCT application serial no. PCT/CN2017/093206, filed on Jul. 17, 2017, which claims the priority benefits of China Application No. 201610569582.4 filed on Jul. 19, 2016. The entirety of each of the above-mentioned patent applications is hereby incorporated by reference herein and made a part of this specification.

BACKGROUND OF THE INVENTION

1. Field of the Invention

The present invention relates to a field of structure design technologies of rotating apparatuses, and in particular, to a rotating mechanism.

2. Description of Related Art

As energy becomes increasingly tense and pollution becomes increasingly severer, modern industries start to develop and use green energy, among which the exploitation of solar energy is the hottest. In constant exploitation of the solar energy, production technology of photovoltaic system is constantly improved, and is gradually widely applied to various fields. The photovoltaic system is an apparatus for directly changing photon energy into electric energy by using a photoelectric effect or a photochemical effect. The photovoltaic system is a core part of a solar power system, and is also the most valuable part in the solar power system. The photovoltaic system not only can convert the solar energy into the electric energy, but also can store electric energy in a storage battery, or is used to push a loading work.

To improve electricity generation efficiency of the photovoltaic system and reduce electricity generation costs, an angle of a solar panel is generally adjusted by using a gyrator or a gear ring, so that the solar panel can effectively track the sun, thereby effectively improving utilization of the solar panel, and improving the electricity generation efficiency. However, accuracy of an existing gyrator is very high, and is far higher than accuracy required for rotation of the solar panel, and manufacturing costs of the existing gyrator is also very high, and therefore, it cannot be widely applied. In addition, a gap of the gear ring rotating mechanism is large, and adjustment accuracy is relatively low.

Therefore, the applicant is devoted to providing a novel rotating mechanism, which a structure thereof is simple, manufacturing cost is low, and structure reliability is high.

SUMMARY OF THE INVENTION

The present invention is directed to providing a rotating mechanism. A structure thereof is simple, manufacturing cost is low, and structure reliability is high.

To resolve the foregoing technical problem, the present invention provides a rotating mechanism including: a base; a disk-shaped support fixed to the base, where a periphery of the disk-shaped support includes a winding end; a traction rope wound around the winding end of the disk-shaped support; an input shaft configured to tension the traction rope and drive the traction rope to slide along the winding end of the disk-shaped support; an output shaft, configured to connect to an external structure; a swing arm, where a first end of the swing arm is connected to the traction rope, and a second end of the swing arm is connected to the output shaft. The traction rope drives the swing arm to rotate, and the swing arm further drives the output shaft to rotate.

Preferably, the winding end is provided with an engaging portion configured to restrict a position of the traction rope.

Preferably, the engaging portion is a recess; and/or the winding end of the disk-shaped support is provided with a plurality of pulleys, and a peripheral wall of the pulley is provided with the engaging portion.

The disposition of the pulleys facilitates stable sliding of the traction rope on the disk-shaped support, thereby further enhancing operation reliability of the rotating mechanism.

Preferably, the first end of the swing arm is provided with a connection member. The connection member is fixedly connected to the traction rope. The connection member slides at the winding end under a drive by the traction rope.

Preferably, a connection segment of the traction rope connected to the connection member is a first continuous structure, and the first continuous structure of the traction rope is threaded into the connection member; or the connection segment of the traction rope connected to the connection member includes a first opening, and two ends of the traction rope at the first opening are respectively fixed to two ends of the connection member.

Preferably, a connection segment of the traction rope connected to the input shaft includes a second opening, a first end and a second end of the traction rope at the second opening are respectively wound around the input shaft, and when the input shaft winds the first end of the traction rope at the second opening, the input shaft simultaneously casts the second end of the traction rope.

Preferably, the first end of the traction rope at the second opening is wound around a first segment of the input shaft in a first direction, and the second end of the traction rope is wound around a second segment of the input shaft in a second direction, and the first direction and the second direction are opposite.

Preferably, the input shaft includes a first input shaft and a second input shaft. The first end of the traction rope at the second opening is wound around the first input shaft. The second end of the traction rope is wound around the second input shaft. When the first input shaft winds the first end of the traction rope at the second opening, the second input shaft casts the second end of the traction rope. When the first input shaft casts the first end of the traction rope at the second opening, the second input shaft winds the second end of the traction rope.

Preferably, a connection segment of the traction rope connected to the input shaft is a second continuous structure, and the second continuous structure is tensioned under an action of the input shaft.

Preferably, the traction rope is wound around the disk-shaped support by one or more turns.

Preferably, the traction rope is a steel wire rope, a nylon rope, a belt, a synchronous belt, or a chain.

Preferably, the winding end of the disk-shaped support is of a circular structure; or the winding end of the disk-shaped support is of an oval structure; or the winding end of the disk-shaped support is of an arc-shaped structure, and a central angle of the arc-shaped structure ranges from 10° to 359°.

Preferably, a distance between each point at the winding end and the output shaft remains unchanged, and a length of the swing arm is constant; or the distance between each point at the winding end and the output shaft is changeable, and the length of the swing arm is adjustable.

Preferably, the disk-shaped support is a solid disc or a hollow disc.

When the disk-shaped support is designed as the solid disc, a structure of the rotating mechanism is more stable and operation is more reliable. However, the manufacturing cost of the rotating mechanism is high. When the disk-shaped support is designed as the hollow disc, the structure of the rotating mechanism is simple, the manufacturing cost of the rotating mechanism is effectively reduced, and this contributes to wider application range of the rotating mechanism.

Preferably, the rotating mechanism further includes a tensioning mechanism disposed on the base, connected to the traction rope, and configured to tension the traction rope during sliding of the traction rope.

The tensioning mechanism can effectively absorb additional traction rope generated during sliding of the traction rope, so that the traction rope may keep a tensioned state, thereby ensuring that the traction rope can effectively drive the swing arm to rotate.

The rotating mechanism in the present invention can achieve at least one of the following beneficial effects:

1. In the rotating mechanism of the present invention, the engaging portion configured to position the traction rope is provided on the disk-shaped support, then, the input shaft drives the traction rope to slide at the winding end, and the swing arm is fixedly connected to the traction rope. Therefore, during sliding of the traction rope, the swing arm also rotates along with the sliding. The swing arm further drives the output shaft to rotate. The rotating mechanism in the present invention has a simple structure and operation reliability. By specifically selecting sizes of the disk-shaped support and the swing arm, a greater moment arm and a greater torque can be applied to the output shaft, to ensure effective rotation of the output shaft.

2. In the rotating mechanism in the present invention, the engaging portion is provided at the winding end of the disk-shaped support, thereby effectively avoiding detachment of the traction rope from the winding end during sliding on the disk-shaped support, and further ensuring stable operation of the rotating mechanism.

3. In the rotating mechanism in the present invention, the swing arm is connected to the traction rope by using a connection member, and the traction rope may drive the connection member to pass through the winding end on the disk-shaped support. Such disposition can increase a range of a rotation angle of the swing arm, and further increase a range of a rotation angle of the output shaft, thereby expending an application range of the rotating mechanism.

4. In the rotating mechanism in the present invention, the connection segment of the traction rope connected to the input shaft may be provided with an opening, that is, the connection segment is of a broken structure. When such disposition is used, winding and casting of two ends of the traction rope at the opening can be simultaneously implemented by using one input shaft, or winding and casting of two ends of the traction rope at the opening can be respectively implemented by using two input shafts. The structure is flexible, and the does not knot easily during sliding.

5. In the rotating mechanism in the present invention, the connection segment of the traction rope connected to the input shaft may be of a continuous structure, then, the input shaft tensions the continuous structure, and the input shaft drives the traction rope. A total length of the traction rope can be reduced through such disposition, thereby avoiding the traction rope from being wound around the input shaft, and further simplifying the structure of the rotating mechanism.

BRIEF DESCRIPTION OF THE DRAWINGS

The following further describes the present invention in detail with reference to the accompanying drawings and specific implementations.

DESCRIPTION OF THE EMBODIMENTS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

Embodiment 1

Figure 1:
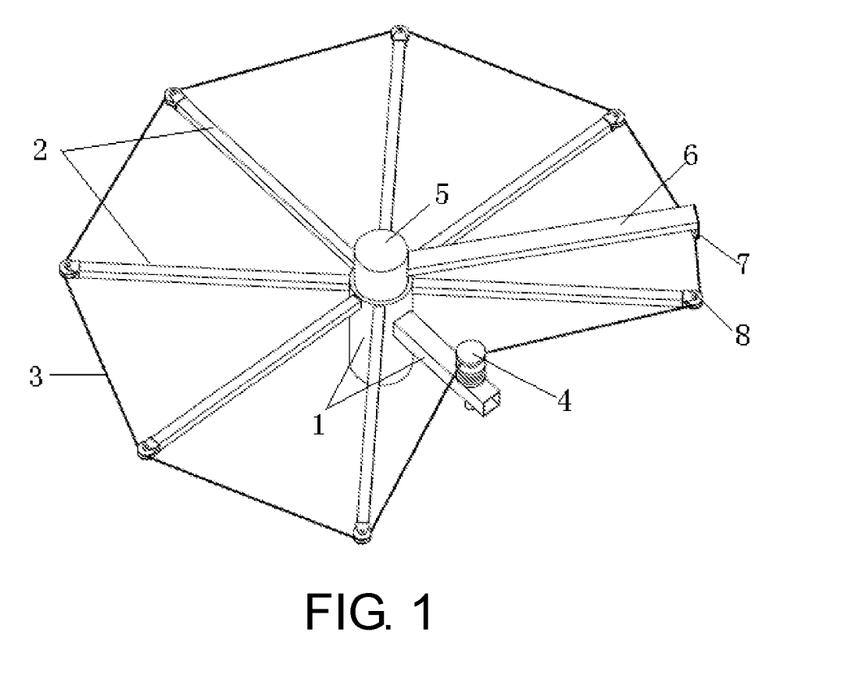
FIG. 1 is a schematic structural diagram of a specific embodiment of a rotating mechanism according to the present invention.

FIG. 1 discloses a rotating mechanism including: a base 1; a disk-shaped support 2 fixed to the base 1, where a periphery of the disk-shaped support 2 includes a winding end; a traction rope 3 wound around the winding end of the disk-shaped support 2; an input shaft 4 configured to tension the traction rope 3 and drive the traction rope 3 to slide along the winding end of the disk-shaped support 2; an output shaft 5 configured to connect to an external structure; and a swing arm 6, where a first end of the swing arm 6 is connected to the traction rope 3, a second end of the swing arm 6 is connected to the output shaft 5. The traction rope 3 drives the swing arm 6 to rotate, and the swing arm 6 further drives the output shaft 5 to rotate around an axis of the output shaft 5.

Specifically, the winding end is provided with an engaging portion configured to restrict a position of the traction rope 3. The engaging portion is configured to avoid detachment of the traction rope from the winding end of the disk-shaped support during sliding.

Specifically, the winding end of the disk-shaped support 2 is provided with a plurality of pulleys 8, a peripheral wall of the pulleys 8 is provided with the engaging portion, and the engaging portion is a recess. The disposition of the pulleys 8 facilitates stable sliding of the traction rope 3 on the disk-shaped support 2, thereby further enhancing operation reliability of the rotating mechanism.

Specifically, the first end of the swing arm 6 is provided with a connection member 7, where the connection member 7 is fixedly connected to the traction rope 3, and the connection member 7 slides at the winding end under a drive by the traction rope 3.

Figure 5:
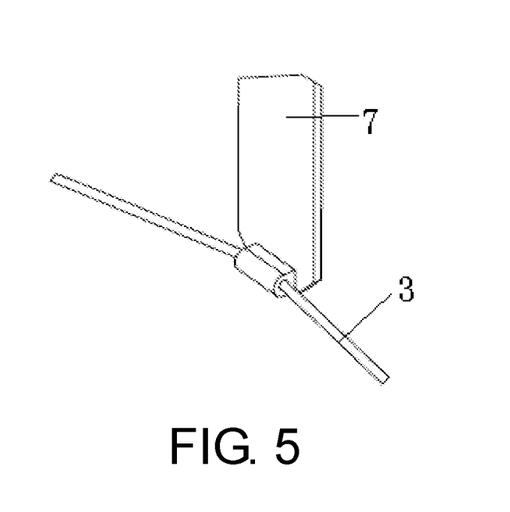
FIG. 5 is an enlarged schematic structural view of a connection portion between a traction rope and a swing arm in the rotating mechanism shown in FIG. 1.

Specifically, a connection segment of the traction rope 3 connected to the connection member 7 is a continuous structure. The connection member 7 includes a connection plate and a clamping pipe. The swing arm is connected to the clamping pipe by using the connection plate, and the continuous structure of the traction rope 3 is threaded into the clamping pipe. The clamping pipe passes through the engaging portion of the disk-shaped support under the drive of the traction rope.

Specifically, a connection segment of the traction rope 3 connected to the input shaft 4 includes an opening. A first end of the traction rope 3 at the opening is wound around a first segment of the input shaft 4 in a first direction, and a second end of the traction rope 3 is wound around a second segment of the input shaft 4 in a second direction, and the first direction and the second direction are opposite. That is, when the input shaft 4 winds the first end of the traction rope 3 at the opening, the input shaft 4 simultaneously casts the second end of the traction rope 3, and the traction rope slides in one direction. On the contrary, when the input shaft 4 casts the first end of the traction rope 3 at the opening, the input shaft 4 simultaneously winds the second end of the traction rope 3, and the traction rope slides in another opposite direction.

Specifically, the disk-shaped support 2 is a disc with a notch. The winding end of the disk-shaped support 2 is of an arc-shaped structure. A distance between each point at the winding end and the output shaft 5 remains unchanged, and a length of the swing arm 6 is constant. In the present embodiment, a central angle of the arc-shaped structure is 270°. Therefore, the swing arm 6 may repeatedly rotate within a range of 0° to 270° by the drive of the traction rope 3.

Specifically, the traction rope 3 is wound around the disk-shaped support 2 by one turn. The traction rope 3 is partially located in the engaging portion of the disk-shaped support 2, and is partially wound around the input shaft 4, and the traction rope 3 is a steel wire rope.

Specifically, the rotating mechanism disclosed in the present embodiment further includes: a tensioning mechanism, disposed on the base 1, connected to the traction rope 3, and configured to tension the traction rope 3 during sliding of the traction rope 3. The tensioning mechanism can effectively absorb additional traction rope 3 generated during sliding of the traction rope 3, so that the traction rope 3 may keep a tensioned state, thereby ensuring that the traction rope 3 can effectively drive the swing arm 6 to rotate.

Embodiment 2

Figure 2:
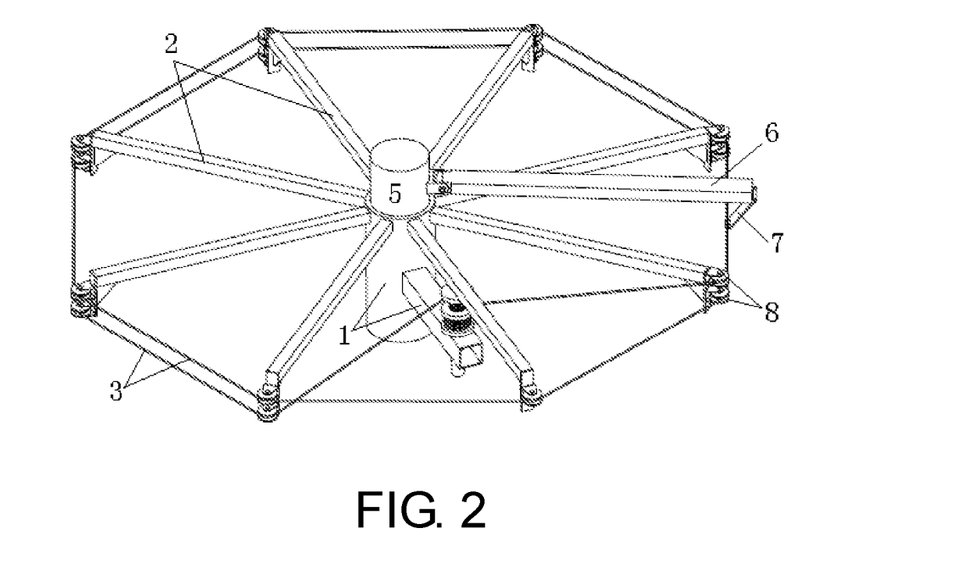
FIG. 2 is a schematic structural diagram of another specific embodiment of a rotating mechanism according to the present invention.

As shown in FIG. 2, in comparison with the embodiment 1, an improvement of an embodiment 2 is that a winding end of a disk-shaped support 2 of a rotating mechanism disclosed in the embodiment 2 is provided with two layers of wire winding portions, and a traction rope 3 is wound around the disk-shaped support 2 by two turns. In an upper layer of the wire winding portion, the traction rope 3 may drive a swing arm 6 to rotate within a range of 0° to 360°. In a lower layer of the wire winding portion, the traction rope 3 may drive the swing arm 6 to rotate within a range of 0° to 270°.

In addition, whole of the two layers of wire winding portions of the winding end is of a spiral shape, and the traction rope 3 may drive the connection member 7 connected to the swing arm 6 to directly transit from the upper layer of the wire winding portion to the lower layer of the wire winding portion.

In the present embodiment, a first end of the swing arm 6 is hingedly connected to the connection member 7. Specifically, the first end of the swing arm 6 is hingedly connected to the connection plate in the connection member 7. When such disposition is used, the connection plate can rotate relative to the swing arm, so that the swing arm 6 can smoothly transmit between two layers of the engaging portions by the drive of the traction rope 3. In addition, the second end of the swing arm 6 is hingedly connected to an output shaft 5. When such disposition is used, the swing arm 6 can be slightly adjusted up and down in an axis direction of the output shaft 5. This further facilitates smooth transition of the swing arm 6 between the two layers of the engaging portions by the drive of the traction rope 3.

The rotating mechanism in the present embodiment may perform angle adjustment within a relatively large angle range, and has a relatively large application range.

Embodiment 3

Figure 3:
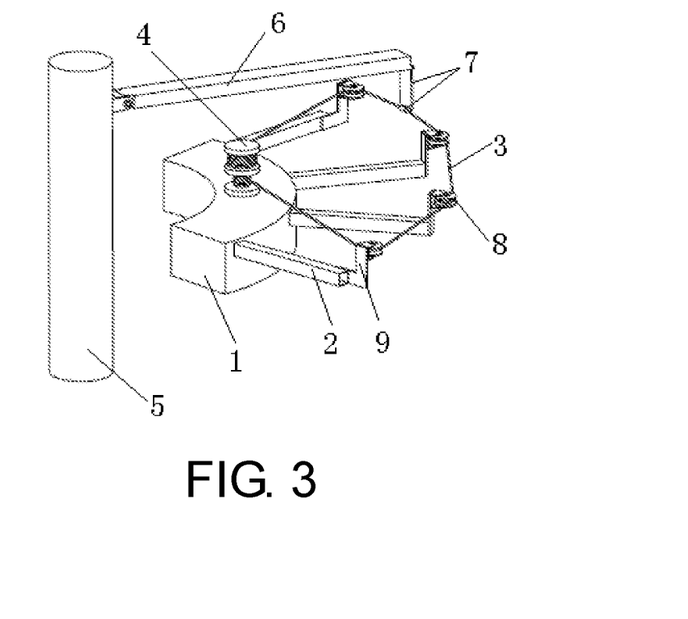
FIG. 3 is a schematic structural diagram of another specific embodiment of a rotating mechanism according to the present invention.
Figure 4:
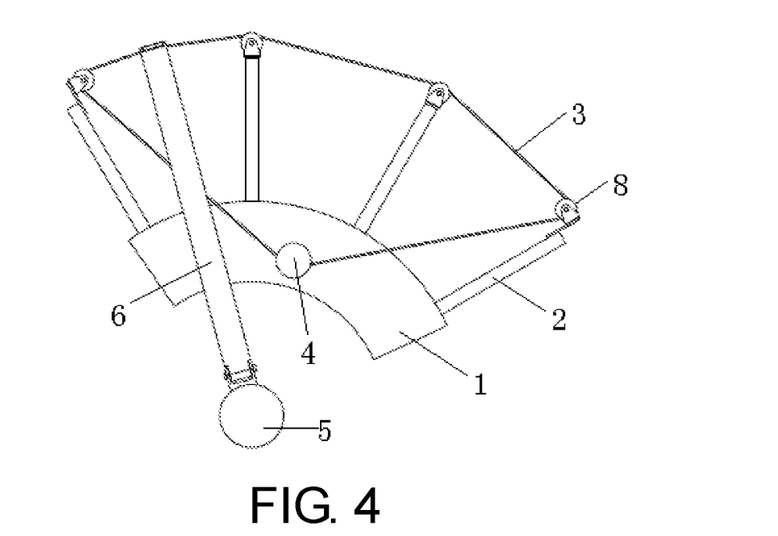
FIG. 4 is a top view of the rotating mechanism shown in FIG. 3.

As shown in FIG. 3 and FIG. 4, compared with the embodiment 1, an improvement of an embodiment 3 is that in a rotating mechanism disclosed in the embodiment 3, the disk-shaped support 2 is a sectoral support, and a central angle thereof is 90°. Further, the winding end of the disk support 2 is of an arc-shaped structure whose central angle is 90°. When such disposition is used, the traction rope 3 in the present embodiment may drive the swing arm 6 to repeatedly rotate within a range of 0° to 90°. In addition, in the present embodiment, the base 1 and the output shaft 5 have different axes, and are spaced apart from each other.

In addition, in the present embodiment, the sectoral support is spliced by a plurality of strip-shaped structures fixed to the base 1, and one end of the strip-shaped structure distant away from the base 1 is provided with an extension portion 9. The extension portion 9 is provided with the pulley 8. The pulley 8 is provided with the engaging portion. Because an input shaft 4 is disposed on an upper surface of the base 1, disposition of the extension portion can enable that heights of the engaging portion and the input shaft 4 are basically the same, so that the traction rope 3 can basically keep on a same horizontal plane. In this way, operation of the rotating mechanism is more stable.

The rotating mechanism disclosed in the present embodiment is applicable to a case of small-range angle adjustment.

Embodiment 4

A rotating mechanism disclosed in an embodiment 4 is basically the same as that disclosed in the embodiment 1, and a difference is that the rotating mechanism disclosed in the embodiment 1 simultaneously implements winding and casting of two ends of the traction rope by using one input shaft. However, in the present embodiment, the rotating mechanism respectively implements winding and casting of two ends of the traction rope by using two input shafts.

In the present embodiment, the input shaft includes a first input shaft and a second input shaft. The connection segment of the traction rope connected to the input shaft includes the opening. The first end of the traction rope at the opening is wound around the first input shaft, and the second end of the traction rope is wound around the second input shaft. When the first input shaft winds the first end of the traction rope at the opening, the second input shaft casts the second end. Correspondingly, when the first input shaft casts the first end of the traction rope at the opening, the second input shaft winds the second end. The first input shaft and the second input shaft may be sleeved together, or may be disposed in parallel.

In the present embodiment, there are two input shafts, so that sliding of the traction rope on the disk-shaped support is more stable, thereby effectively preventing the traction rope from knotting.

It should be noted that the present embodiment is improved based on the embodiment 1. Certainly, a same improvement may be made to other embodiments based on the embodiment 2 and embodiment 3. The descriptions thereof are omitted herein.

Embodiment 5

A rotating mechanism disclosed in an embodiment 5 is basically the same as that disclosed in the embodiment 1, and a difference is that in the rotating mechanism in the embodiment 1, the connection segment of the traction rope connected to the input shaft includes the opening. However, in the present embodiment, the connection segment of the traction rope connected to the input shaft is of a continuous structure.

In the present embodiment, the traction rope is specifically a belt. The belt is tensioned under an action of the input shaft, and the input shaft drives the traction rope through a friction between the input shaft and the traction rope.

In the present embodiment, the swing arm can repeatedly or continuously rotate within a range of 0° to 360° with sliding of the belt. In addition, whole of the belt is located on a same plane on the disk-shaped support. Such disposition can enable the belt to slide more stably, and further, enable the swing arm to rotate more stably.

It should be noted that the present embodiment is improved based on the embodiment 1. Certainly, a same improvement may be made to other embodiments based on the embodiment 2 and embodiment 3. The descriptions thereof are omitted herein.

Embodiment 6

A rotating mechanism disclosed in an embodiment 6 is basically the same as that disclosed in the embodiment 1, and a difference is that in the rotating mechanism in the embodiment 1, the connection segment of the traction rope connected to the input shaft includes the opening. However, in the present embodiment, the connection segment of the traction rope connected to the input shaft is of a continuous structure.

In the present embodiment, the traction rope is specifically a chain, and the input shaft is a chain wheel. The chain is tensioned under an action of the chain wheel, and the chain wheel drives the chain by being driven by a motor.

In the present embodiment, the swing arm can repeatedly or continuously rotate within a range of 0° to 360° with sliding of the chain. In addition, whole of the chain is located on a same plane on the disk-shaped support. Such disposition can enable the chain to slide more stably, and further, enable the swing arm to rotate more stably.

It should be noted that the present embodiment is improved based on the embodiment 1. Certainly, the same improvement may be made to other embodiments based on the embodiment 2 and embodiment 3. The descriptions thereof are omitted herein.

Embodiment 7

A rotating mechanism disclosed in an embodiment 7 is basically the same as that disclosed in the embodiment 1, and a difference is that in the rotating mechanism in the embodiment 1, the connection segment of the traction rope connected to the input shaft includes the opening. However, in the present embodiment, the connection segment of the traction rope connected to the input shaft is of a continuous structure.

In the present embodiment, the traction rope is specifically a synchronous belt, and the input shaft is a synchronous belt wheel. The synchronous belt is tensioned under an action of the synchronous belt wheel, and the synchronous belt wheel drives the synchronous belt by being driven by a motor.

In the present embodiment, the swing arm can repeatedly or continuously rotate within a range of 0° to 360° with sliding of the synchronous belt. In addition, whole of the synchronous belt is located on a same plane on the disk-shaped support. Such disposition can enable the synchronous belt to slide more stably, and further, enable the swing arm to rotate more stably.

It should be noted that the present embodiment is improved based on the embodiment 1. Certainly, the same improvement may be made to other embodiments based on the embodiment 2 and embodiment 3. The descriptions thereof are omitted herein.

Embodiment 8

Figure 6:
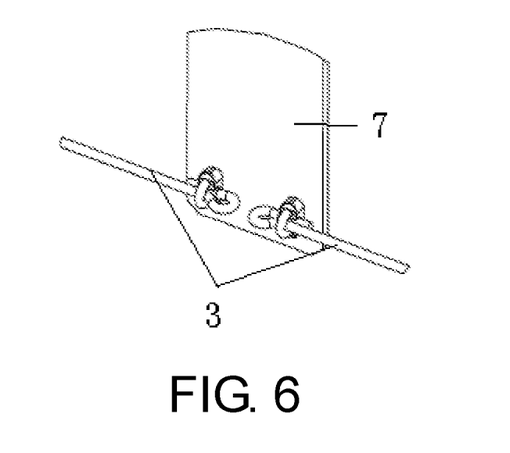
FIG. 6 is an enlarged schematic structural diagram of a connection portion between a traction rope and a swing arm in another specific embodiment of a rotating mechanism according to the present invention.

A rotating mechanism disclosed in an embodiment 8 is basically the same as that disclosed in the embodiment 1. In the rotating mechanism, the traction rope 3 and the swing arm are connected by using a connection member 7, and a difference is that, as shown in FIG. 5, in the rotating mechanism in the embodiment 1, the connection segment of the traction rope 3 connected to the connection member 7 is of the continuous structure. However, in the present embodiment, as shown in FIG. 6, the connection segment of the traction rope 3 connected to the connection member 7 includes the opening, and two ends of the traction rope at the opening are respectively fixed to two ends of the connection member.

Such connection manner can effectively ensure a fixed connection between the swing arm and the traction rope, and further ensure that during sliding of the traction rope, the swing arm can effectively rotate with sliding of the traction rope, thereby effectively ensuring effective operation of the rotating mechanism.

It should be noted that the present embodiment is improved based on the embodiment 1. Certainly, the same improvement may be made to other embodiments based on the embodiment 2, embodiment 3, embodiment 4, embodiment 5, embodiment 6, and embodiment 7. The descriptions thereof are omitted herein.

Embodiment 9

A rotating mechanism disclosed in an embodiment 9 is basically the same as that disclosed in the embodiment 1, and a difference is that in the rotating mechanism in the embodiment 1, a distance between the winding end and the output shaft of the disk-shaped support remains unchanged, and the length of the swing arm is constant. However, in the present embodiment, the disk-shaped support is an oval support, a distance between a winding end and output shaft of the oval support is variable, and correspondingly, the length of the swing arm is adjustable.

It should be noted that the present embodiment is improved based on the embodiment 1. Certainly, the same improvement may be made to other embodiments based on the embodiment 2, embodiment 3, embodiment 4, embodiment 5, embodiment 6, embodiment 7, and embodiment 8. The descriptions thereof are omitted herein.

Certainly, in other embodiments, the engaging portion may be selectively disposed. The disk-shaped support may alternatively be designed as a solid disc. When such disposition is used, the structure of the rotating mechanism is more stable, and has operation reliability. However, the manufacturing cost is also correspondingly high. The disk-shaped support may be formed by setting a hollow structure on the solid disc. Bases of the disk-shaped support, the input shaft, and the output shaft may be respectively disposed, or may be a same base. The disk-shaped support may alternatively be integrated with the base. The traction rope may be a steel wire rope, a nylon rope, a belt, a synchronous belt, or another type of rope according to requirements. The winding end of the disk-shaped support is of a circular structure, an oval structure, an arc-shaped structure whose central angle ranges from 10° to 359°, or another irregular shape. Certainly, the central angle of the arc-shaped structure may be slightly adjusted within 0° to 10° and 359° to 360°. The tensioning mechanism may be selectively disposed. In an embodiment in which the traction rope is wound around the disk-shaped support by a plurality of turns. When the swing arm rotates from one turn to another turn by being driven by the traction rope, the output shaft may be fixed relatively to the base or may descend or ascend within a range. In addition, in the rotating mechanism in the present invention, a relative positional relationship between the disk-shaped support, the base, the input shaft, and the output shaft may be adjusted according to requirements. The descriptions thereof are omitted herein.

For example, as shown in FIG. 1, a specific application cases of the embodiment 1 of the rotating mechanism of the present invention are as follows:

1. A motor controls the input shaft 4 to rotate, and the input shaft 4 casts the first end of the traction rope 3, and simultaneously winds the second end of the traction rope 3.

2. The traction rope 3 slides on the disk-shaped support 2 along the recesses on the pulleys 8.

3. The traction rope 3 drives the swing arm 6 to rotate through the connection member 7.

4. The swing arm 6 drives the output shaft 5 to rotate.

In the rotating mechanism in the present invention, by increasing the length of the swing arm, a greater moment arm and a greater torque can be applied to the output shaft, thereby further implementing effective rotation of the output shaft. The structure of the rotating mechanism is simple, has low manufacturing cost, can be promoted within a relatively large range, and is specifically applicable to angle adjustment in a photovoltaic panel in a solar electricity generation system. In the solar electricity generation system, an angle of the photovoltaic panel in a horizontal direction or vertical direction may be adjusted by disposing a rotating mechanism disclosed in the present invention, and angles of the photovoltaic panel in the horizontal direction and the vertical direction may be simultaneously adjusted by disposing two rotating mechanisms in the present invention.

Certainly, the rotating mechanism in the present invention may further be applied to wind energy generation, bioenergy generation, or another industrial field.

The foregoing descriptions are merely exemplary implementation manners of the present invention. It should be noted that a person of ordinary skill in the art may make several improvements or polishing without departing from the principle of the present invention and the improvements or polishing shall fall within the protection scope of the present invention.

What is claimed is:

1. A rotating mechanism, comprising:
a base;
a disk-shaped support, fixed to the base, a periphery of the disk-shaped support having a winding end;
a traction rope, wound around the winding end of the disk-shaped support;
an input shaft, configured to tension the traction rope and drive the traction rope to slide along the winding end of the disk-shaped support;
an output shaft, configured to connect to an external structure; and
a swing arm, wherein a first end of the swing arm is connected to the traction rope, and a second end of the swing arm is connected to the output shaft,
wherein the traction rope drives the swing arm to rotate, and the swing arm further drives the output shaft to rotate, and
the first end of the swing arm is provided with a connection member, the connection member is fixedly connected to the traction rope, and the connection member slides at the winding end under a drive of the traction rope.

2. The rotating mechanism according to claim 1, wherein:
the winding end is provided with an engaging portion configured to restrict a position of the traction rope.

3. The rotating mechanism according to claim 2, wherein:
the engaging portion is a recess; and/or
the winding end of the disk-shaped support is provided with a plurality of pulleys, and a peripheral wall of the pulley is provided with the engaging portion.

4. The rotating mechanism according to claim 1, wherein:
a connection segment of the traction rope connected to the connection member is a first continuous structure, and the first continuous structure of the traction rope is threaded into the connection member; or
the connection segment of the traction rope connected to the connection member comprises a first opening, and two ends of the traction rope at the first opening are respectively fixed to two ends of the connection member.

5. The rotating mechanism according to claim 1, wherein:
a connection segment of the traction rope connected to the input shaft comprises a second opening, a first end and a second end of the traction rope at the second opening are respectively wound around the input shaft, and when the input shaft winds the first end of the traction rope at the second opening, the input shaft simultaneously casts the second end of the traction rope.

6. The rotating mechanism according to claim 5, wherein:
the first end of the traction rope at the second opening is wound around a first segment of the input shaft in a first direction, and the second end of the traction rope is wound around a second segment of the input shaft in a second direction, and the first direction and the second direction are opposite; or the input shaft comprises a first input shaft and a second input shaft; the first end of the traction rope at the second opening is wound around the first input shaft; the second end of the traction rope is wound around the second input shaft; when the first input shaft winds the first end of the traction rope at the second opening, the second input shaft casts the second end of the traction rope; and when the first input shaft casts the first end of the traction rope at the second opening, the second input shaft winds the second end of the traction rope.

7. The rotating mechanism according to claim 1, wherein:
a connection segment of the traction rope connected to the input shaft is a second continuous structure, and the second continuous structure is tensioned under an action of the input shaft.

8. The rotating mechanism according to claim 1, wherein:
the traction rope is wound around the disk-shaped support by one or more turns.

9. The rotating mechanism according to claim 1, wherein:
the traction rope is a steel wire rope, a nylon rope, a belt, a synchronous belt, or a chain.

10. The rotating mechanism according to claim 1, wherein:
the winding end of the disk-shaped support is of a circular structure; or
the winding end of the disk-shaped support is of an oval structure; or
the winding end of the disk-shaped support is of an arc-shaped structure, and a central angle of the arc-shaped structure ranges from 10° to 359°.

11. The rotating mechanism according to claim 1, wherein:
a distance between each point at the winding end and the output shaft remains unchanged, and a length of the swing arm is constant; or
the distance between each point at the winding end and the output shaft are changeable, and the length of the swing arm is adjustable.

12. The rotating mechanism according to claim 1, wherein:
the disk-shaped support is a solid disc or a hollow disc.

13. The rotating mechanism according to claim 1 further comprising:
a tensioning mechanism, disposed on the base, connected to the traction rope, and configured to tension the traction rope during sliding of the traction rope.

* * * * *